(12) United States Patent
Hussain et al.

(10) Patent No.: US 11,579,901 B1
(45) Date of Patent: Feb. 14, 2023

(54) PROVISIONING ENGINE HOSTING SOLUTION FOR A CLOUD ORCHESTRATION ENVIRONMENT

(71) Applicant: Amazon Technologies, Inc., Reno, NV (US)

(72) Inventors: Amjad Hussain, Bellevue, WA (US); Diwakar Chakravarthy, Kirkland, WA (US); Asif Hussain, Redmond, WA (US); Rahul Garg, Bellevue, WA (US); Victoria Michelle Jacobson, Camano Island, WA (US); Sunil Jagadish, North Vancouver (CA); James Hood, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 49 days.

(21) Appl. No.: 17/364,260

(22) Filed: Jun. 30, 2021

(51) Int. Cl.
*G06F 9/445* (2018.01)
*G06F 9/50* (2006.01)

(52) U.S. Cl.
CPC ...... *G06F 9/44526* (2013.01); *G06F 9/44505* (2013.01); *G06F 9/5027* (2013.01)

(58) Field of Classification Search
None
See application file for complete search history.

(56) References Cited

U.S. PATENT DOCUMENTS

| | | | | |
|---|---|---|---|---|
| 9,535,754 B1* | 1/2017 | Suarez | ............... | G06F 9/4881 |
| 2007/0083588 A1* | 4/2007 | Keller | ............... | G06Q 10/06 |
| | | | | 709/202 |
| 2007/0106798 A1* | 5/2007 | Masumitsu | ............ | G06F 9/5044 |
| | | | | 709/226 |
| 2008/0244606 A1* | 10/2008 | Wylie | ............... | G06F 9/5038 |
| | | | | 718/104 |
| 2011/0265087 A1* | 10/2011 | Chen | ............... | G06F 9/5005 |
| | | | | 718/102 |
| 2014/0095680 A1* | 4/2014 | Addison | ............ | G06F 9/5027 |
| | | | | 709/222 |
| 2014/0215080 A1* | 7/2014 | Alabiso | ............ | H04L 41/0806 |
| | | | | 709/226 |

* cited by examiner

*Primary Examiner* — Qing Chen
(74) *Attorney, Agent, or Firm* — Hogan Lovells US LLP

(57) ABSTRACT

Systems and methods provide for execution of different provisioning engines within a resource provider environment. A user may submit a request to provision one or more resources using a particular provisioning engine, which may include a provisioning engine that is non-native to the resource provider environment. A control plane may evaluate and transmit requests to the provisioning engine executing within the resource provider environment. Operations associated with the provisioning engine may be executed and stored within a data store, which may be processed upon completion and made accessible.

19 Claims, 10 Drawing Sheets

PROVISIONING ENGINE HOSTING SOLUTION FOR A CLOUD ORCHESTRATION ENVIRONMENT

BACKGROUND

As an increasing number of applications and services are being made available over networks such as the Internet, an increasing number of content, application, and service providers are turning to technologies such as remote resource sharing and cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources. The user may wish to utilize different provisioning engines based on their personal preferences when using services with different resource providers, but may experience problems with engine capabilities.

BRIEF DESCRIPTION OF THE DRAWINGS

Various embodiments in accordance with the present disclosure will be described with reference to the drawings, in which.

DETAILED DESCRIPTION

Figure 1:
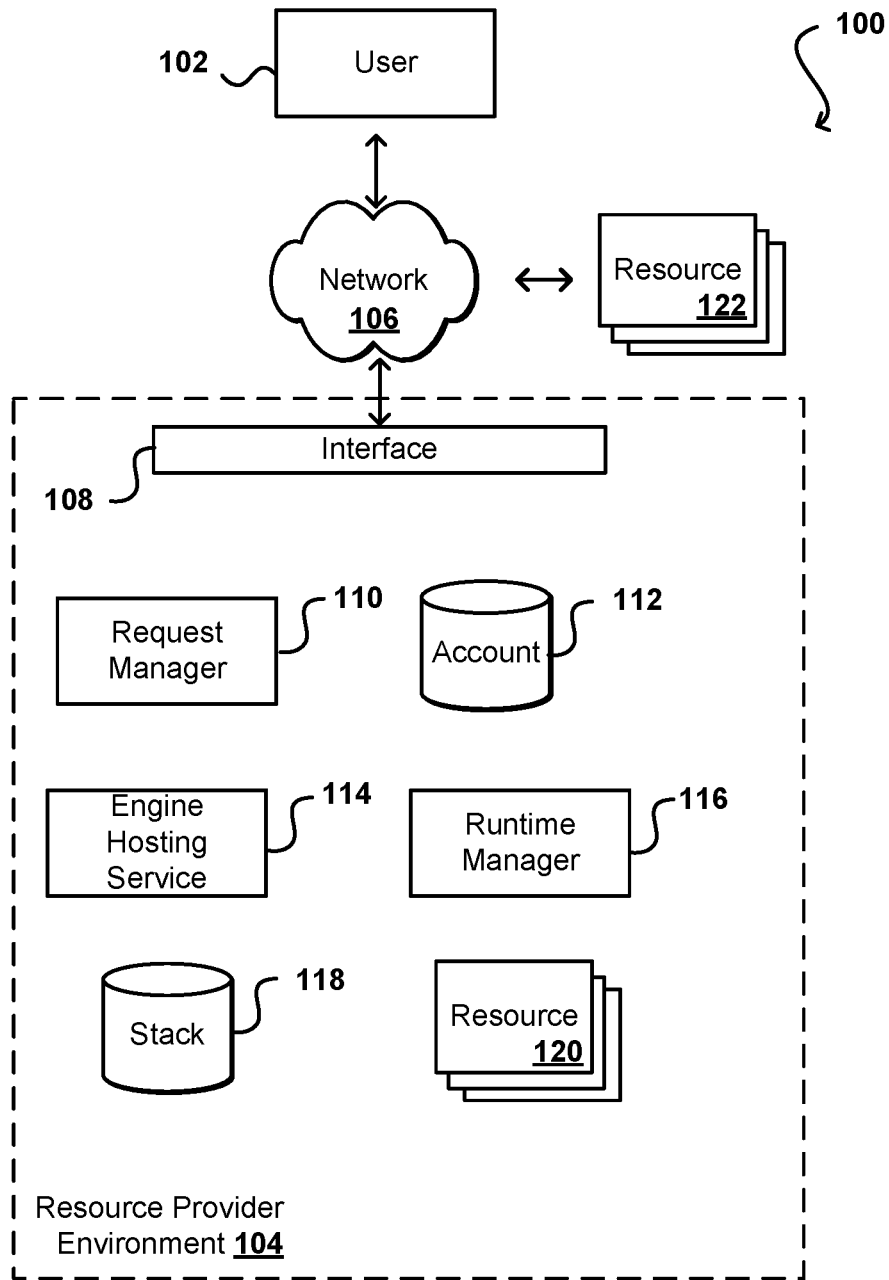
FIG. 1 illustrates an example system for provisioning resources in accordance with various embodiments.

Users may utilize services offered by a resource provider with one or more provisioning engines in order to manage and execute various tasks associated with one or more resources, such as cloud resources, serverless resources, locally hosted resources, on premises resources, and various others. These provisioning engines may be tools for infrastructure as code and may automatically manage, monitor, and provision resources (e.g., compute resources, store resources, virtual machines, etc.) through code instead of through manual processes. For example, one or more configuration files may be created that contain infrastructure specifications, simplifying the process for users to edit and distribute configurations. Various engines may be utilized within an organization, for example due to personal preferences, incorporation of additional teams or projects from other organizations, and the like. Users may want to continue using their engine of choice across a variety of different resource provider environments, which may be challenging when different engines utilize different plugins, different security levels, and have different functionality. Embodiments of the present disclosure are directed toward one or more services to enable users to select or provide one or more provisioning engines for use with a resource provider environment. In various embodiments, systems and methods may provide a control service that utilizes one or more overlay application programming interfaces (API) to interact with a selected provisioning engine and to provide the user with a consistent interactive environment when using the resource provider environment, regardless of the provisioning engine selected.

Various embodiments of the present disclosure are directed toward an engine hosting solution that is engine agnostic to enable users to provide or select different provisioning engines for a resource provider environment. For example, one or more users may utilize the engine hosting service to deploy infrastructure using a variety of different provisioning engines. The users may pass infrastructure definitions to a selected engine, where the engine hosting solution may recognize and format the definitions to conform to the selected engine and/or modify the infrastructure definitions to a default or standard form. In various embodiments, plugins and other features of the provisioning engines may also be retrieved, for example based on instructions received from the engine hosting solution based, at least in part, on the definitions.

In at least one embodiment, systems and methods may provide a control service that handles requests submitted by users and is also engine agnostic. That is, the control service may handle both API requests and provisioning engine agnostic logic (e.g., logic where behavior is the same regardless of the engine used). For engine-specific logic (e.g., logic specific to a particular engine), the control service may communicate with a provisioning service to provide the requested task and then enable the provisioning service to interact with the engine in order to execute the command. Accordingly, multiple different provisioning engines may be utilized with systems and methods of the present disclosure.

FIG. 1 illustrates an example system 100 that can enable a user 102 (e.g., a client operating on a client device) to obtain access to or provision one or more resources provided as part of a resource provider environment 104. It should be appreciated that various other components may also be included, or hosted separately in a different environment, and are not shown for clarity with the following discussion. Furthermore, these components are shown by way of example and are not intended to limit the scope of the present disclosure. These resources can include physical and virtual resources that may be located at one or more locations controlled by the provider or a third-party, or may be located on a location controlled by the user, or an entity with which the user is associated. In this example, a user 102 can utilize the client device to access resources of the resource provider environment 104 over one or more networks 106. The client device 102 can include any appropriate electronic device operable to send and receive requests, messages, or other such information over an appropriate network and convey information back to a user of the device. Examples of such client devices include personal computers, tablet computers, smart phones, notebook computers, and the like. The network(s) 106 can include any appropriate network, including an intranet, the Internet, a cellular network, a local area network (LAN), or any other such network or combination, and communication over the network can be enabled via wired and/or wireless connections. The resource provider environment 104 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

The resource provider environment 104 may be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network may implement various computing resources or services, which may include a virtual compute service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services (referred to in various implementations as cloud disks service, a managed disk service, a storage area network service, a persistent disk service, or a block volumes service), or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

In various embodiments, the resource provider environment 104 may include various types of electronic resources that can be utilized by multiple users for a variety of different purposes. In at least some embodiments, all or a portion of a given resource or set of resources might be allocated to a particular user or allocated for a particular task, for at least a determined period of time. This can include, for example, enabling a customer to launch one or more instance of one or more types of these resources. In at least one embodiment, a resource instance can include storage volumes, compute instances, and network interfaces, among other such options. This can include, for example, enabling a customer to launch one or more instances of one or more types of these resources. The sharing of these multi-tenant resources from a provider environment is often referred to as resource sharing, Web services, or "cloud computing," among other such terms and depending upon the specific environment and/or implementation.

In one embodiment, the resource provider environment 104 can correspond to a service provider that, in addition to providing access to the resources, may also provide additional monitoring and management services, which can use resource capacity from one or more storage solutions, among other options, to provision resources for a resource stack associated with a user account. In this example, a request to the resource provider environment 104 can be received by an interface layer 108 of the environment. As known for network environments, the interface layer can include components such as interfaces (e.g., APIs), load balancers, request and/or data routers, and the like. In various embodiments, the request may include a command or an input, which may be accompanied by additional data, such as a file upload that may correspond to one or more definitions for provisioning one or more stacks.

The request may be associated with a variety of different resources, applications, extensions, storage solutions, and the like. A request manager 110 may evaluate the request and determine whether or not the user is authorized to make the request, whether resources are available, and the like. By way of example, the request manager 110 may evaluate information from one or more account databases 112 to determine whether the requestor is authorized to proceed, for example by passing credentials, requesting credentials from the user, or other types of verification processes. In at least one embodiment, user access may be restricted based on characteristics of the user. For example, a higher level employee may have read and write access to certain files, while a junior employee may only have read access. It should be appreciated that an administrator may set permission levels that may be accessed and evaluated by the request manager 110.

In the illustrated embodiment, an engine hosting service 114 (e.g., engine hosting solution, hosting architecture, etc.) may provide one or more APIs for performing various operations, such as receiving information from the user, executing one or more commands, identifying and retrieving one or more provisioning engines, and the like. Furthermore, in at least one embodiment, the engine hosting service 114 may include one or more databases, or may have access to one or more databases, in order to save or retrieve information, such as cached files to increase an execution speed for various operations. In one or more embodiments, the APIs may be stored in one or more databases and execute as a thin layer over one or more data models. In at least one embodiment, management APIs may be built on top of various resource APIs that are used to manipulate tasks for various provisioned environments. In operation, the engine hosting service 114 may include one or more control services or control planes to execute different operations based, at least in part, on how the operation relates to a selected provisioning engine. By way of example only, a first control service may execute service-agnostic commands while a second control service may execute service-specific commands.

In operation, the engine hosting service 114 may be utilized to call one or more runtime managers 116, which may be used to allocate resources, which may be serverless or provisioned computing environments, for running one or more containers associated with a selected engine. It should be appreciated that the runtime manager 116, or other components, may be integrated into the engine hosting service 114 or other systems of the resource provider environment 104, as well as be separately hosted and accessible via the network 106. Moreover, embodiments of the present disclosure may be executed with multiple different environments using one or more resources hosted by or positioned within different environments, such as cloud environments, on premises resources, and the like. Furthermore, various embodiments may be executed using serverless environments. Additionally, it should be appreciated that users may determine which environment is utilized, which may include environments managed or otherwise developed by the user.

Various embodiments may also include one or more databases, such as a stack database 118, to store information related to the environments being provisioned and utilized by the user 102. By way of example only, the stack database 118 may be utilized as a support service to enable operation of multiple different provisioning engines, as well as provide availability of tables and other resources between different APIs executing within the engine hosting service 114, such as between first and second level control services.

In at least one embodiment, the resource provider environment 104 also includes one or more resources 120, or in addition or in the alternative, may be in communication with one or more externally hosted resources 122. As noted herein, external resources may include various resources that are in communication with the environment 104, such as resources hosted by different service providers, on premises resources, locally hosted resources, and the like. The resources 120, 122 may correspond to items such as compute resources, databases, firewalls, container clusters, machine learning systems, and the like. Furthermore, the resources 120, 122 may be temporarily provisioned or executed resources to instantiate or otherwise begin a task that may utilized additional resources. By way of example only, the resources 120, 122 may be used to host one or more tasks, for example responsive to a request or execution of instructions by the engine hosting service 114 and/or the runtime manager 116.

Embodiments of the present disclosure may provide a facade or overlay API to enable users to utilize and interact with a provisioning engine of their choice while still incorporating features of a separate resource provider environment, where the provisioning engine may be non-native with respect to the resource provider environment. Various embodiments enable users to provide or otherwise select a desired provisioning engine, find and enable plugins, and then utilize the selected engine within the resource provider environment. As a result, users may receive one or more benefits of additional functionality associated with the resource provider environment, such as cataloging tools, templates, and the like, while still using their selected provisioning engine of choice. Moreover, systems and methods may be utilized to determine discrepancies or incompatibilities between commands within the resource provider environment and the provisioning engine in order to provide the user with information and/or alerts when one or more features will not be carried over with their selected provisioning engine. In this manner, the user may continue to utilize a known or comfortable engine within a resource provider environment while still receiving benefits of the resource provider environment.

Figure 2:
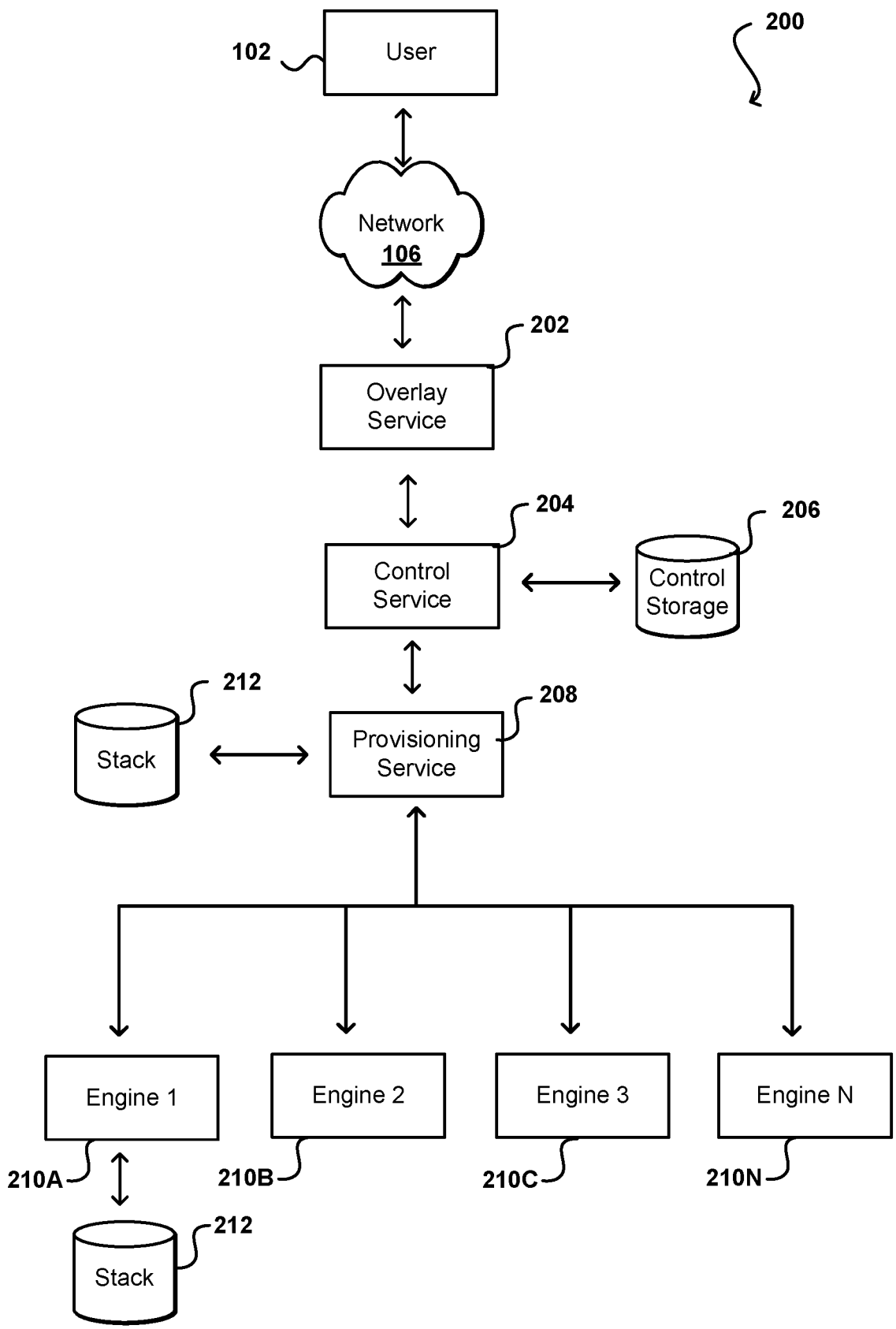
FIG. 2 illustrates an example environment for provisioning resources in accordance with various embodiments.

FIG. 2 illustrates an environment 200 that may be used with one or more embodiments of the present disclosure. In this example, the user 102 may transmit a request over the network 106, as noted above, which may include instructions to complete one or more tasks, code portions, configuration files, or the like. The instructions are transmitted through an overlay service 202, which may be utilized to generate one or more facades corresponding to an appearance for the user. For example, the facade may include one or more interactable elements, allow a user to configure an appearance of the system, or the like. Furthermore, in various embodiments, the facade may include branding or other information to identify the resource provider environment, the selected engine, or the like.

The user may interact with the overlay service 202 by selecting one or more icons or uploading a configuration file to initialize an infrastructure as code procedure where one or more resources are provisioned for use by the user. In at least one embodiment, at least partial customization is enabled for the engine and the configuration file may include one or more options for customization. In this example, instructions are transmitted to a control service 204. In various embodiments, the control service 204 is configured for operation with one or more engine-agnostic operations (e.g., engine-agnostic logic). By way of example, engine-agnostic operations may correspond to operations that may be utilized with any engine selected by the user, such as creating a new stack. These operations are considered to be engine-agnostic because the same behavior/operation will occur, regardless of which engine is utilized.

In one or more embodiments, the control service 204 provides external and internal APIs for reading/writing the API entities the user 102 interacts with, such as stacks, stack resources, stack events, change sets, and the like. The engine-agnostic nature of the control service 204 enables the underlying engine to execute one or more tasks in whatever manner is appropriate for the engine, as long as the outcome remains consistent and/or the same as with any other engine. In various embodiments, the control service 204 stores the results of the provision engine execution for customer query, for example within the control storage datastore 206. As will be noted herein, the control service 204 may include one or more sets of logic or algorithms to evaluate and maintain consistent data and enforce stack rules.

Various embodiments of the present disclosure may use the control service 204 as a common frontend API for engine-specific operations. In one or more embodiments, these APIs may be operational with underlying engines that do work synchronously, such as template validation, but in various embodiments the APIs will queue asynchronous engine workflows to perform one or more operations.

The illustrated environment 200 further includes a provisioning service 208, which may act as a common provisioning service for a plurality of engines 210. That is, the provisioning service 208 may include a common API for the control service 204 to interact with, regardless of the engine 210 selected by the user 102. In various embodiments, operations that are non-engine-agnostic may be delegated from the control service 204 to the provisioning service 208. That is, tasks may be delegated to the provisioning service 208, which may then route the request to the appropriate underlying engine 210 for implementation.

In various embodiments, the provisioning service 208 functions as a frontend service and maintains engine metadata associated with various stack operations, for example within a stack data store 212. During operation, the provisioning service 208 routes specific requests to various engines 210, for example upon receiving a command from the control service 204. In certain embodiments, the provisioning service 208 may further prepare input artifacts utilized by one or more engines 210 and store them within the stack data store 212 and/or one or more additional data stores. Moreover, the provisioning service 208 may query or otherwise initialize a runtime service for execution and operation of the one or more engines 210. Furthermore, in embodiments, the provisioning service 208 monitors engine operations and processes output artifacts produced by the engine, and may further provide information back to the control service 204.

By way of example, the user 102 may submit a request to create a new change set (e.g., CreateChangeSet) to the control service 204. The provisioning service 208 may receive the request from the control service 204 and read a configuration file (e.g., a configuration zip) from the user, which may be either provided with the request or be previously stored. The configuration may then be stored within the stack data store 212 and execution of the engine 210 may begin. Artifacts are utilized with execution of the engine 210 and the provisioning service 208 may monitor the status of engine execution and, on completion, process the artifacts and provide information back to the control service 204.

Figure 3:
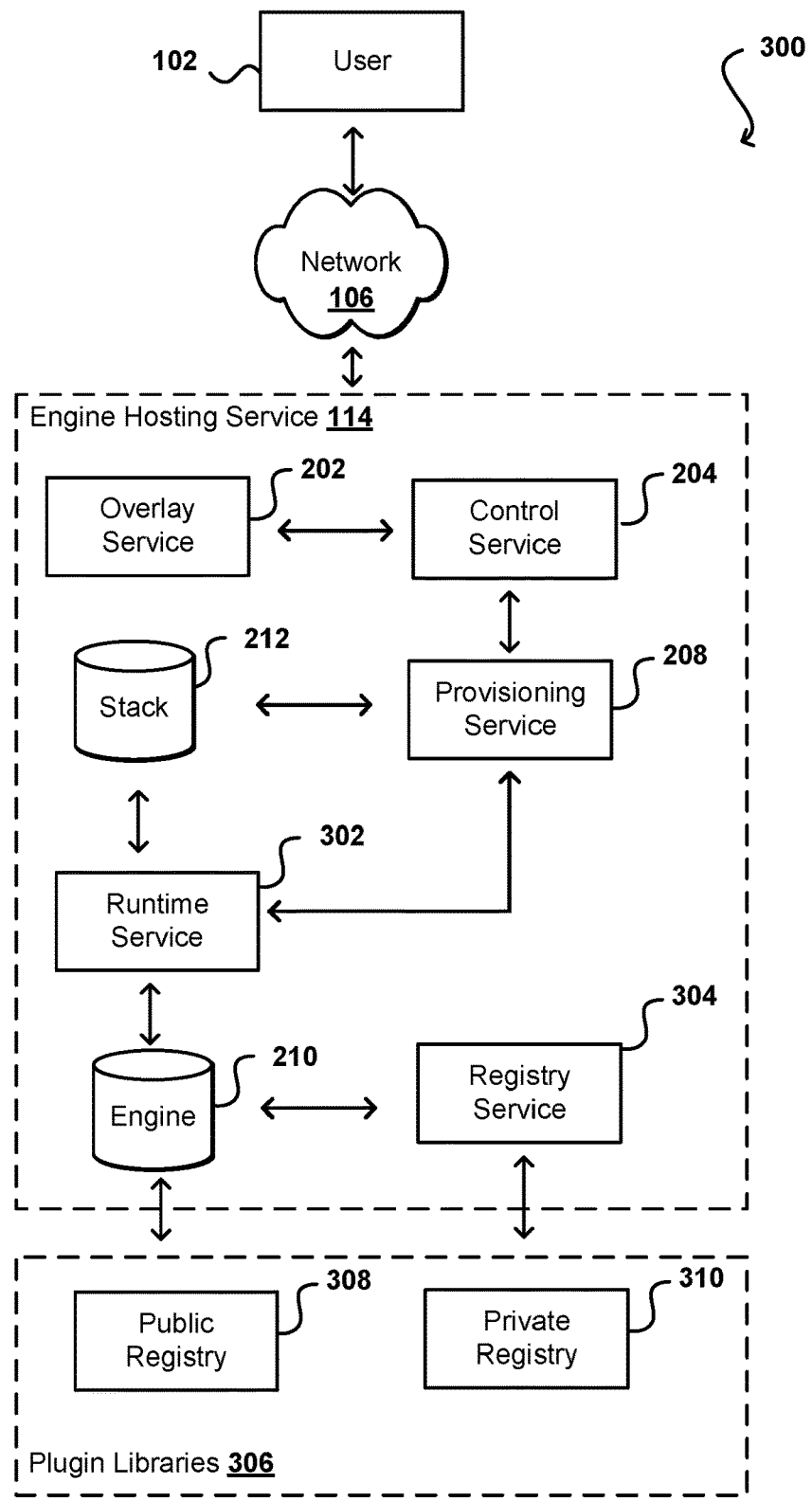
FIG. 3 illustrates an example environment for hosting an engine for provisioning resources in accordance with various embodiments.

FIG. 3 illustrates an environment 300 that may be used with one or more embodiments of the present disclosure. In this example, the engine hosting service 114 is positioned to receive requests and/or messages from the user 102 via the network 106. It should be appreciated that various features have been removed for clarity with the following discussion. Moreover, the illustrated embodiment may include or show one or more features or services being integrated within the engine hosting service 114, which is shown by way of example only and not intended to limit the scope of the present disclosure, as various systems may be separately hosted or accessible from other systems. In operation, the user 102 may transmit a message or request to the engine hosting service 114, such as a request to utilize one or more provisioning engines in order to manage and provision one or more resources associated with the user account. As noted above, various operations may be performed to verify the identity of the user and permissions of the user, such as passing credentials, verifying keys, and the like.

The illustrated overlay service 202 may act as a facade that presents a configurable environment or interface for the user 102 to interact and submit queries through. In an example, the overlay service 202 may provide a gateway API or include access to multiple APIs where the user 102 may select one or more tasks or one or more programs that enable operation of one or more tags. In various embodiments, different tool sets and the like may be incorporated into the facade to simplify interactions for the user, such as selectable elements as opposed to a command line interface.

As noted above, the control service 204 may receive requests from the user 102, such as those entered through one or more elements of the facade generated via the overlay service 202. In one or more embodiments, the requests may also include configuration files, which may be particularized for engines selected by and utilized by the user. By way of example, the user 102 may pass one or more configuration files, such as zip archives, to enable use of the configuration files as well as provide a way to pass additional information to the system for later execution without the need for engine-specific parameters. In an example, the user 102 may pass in endpoints and API token location information for external private registries for use with their selected engine.

The control service 204 may support various operations of an associated resource provider environment or one or more provisioning engines, such as stacks, stack resources, stack events, change sets, and the like. The control service 204 may be responsive to external user API requests for the entities it is authorized to control or utilize. As noted above, various embodiments utilize the control service 104 as an engine-agnostic tool that provides validations and may enforce API-level invariants. In at least one embodiment, the control service 204 is configured to enforce stack termination protections, verify that incoming stack requests are valid, and enforce change set locking, among other features. In various embodiments, these examples of logic illustrate various engine-agnostic logic sets, which may not be particular or specific to any particular provisioning engine, and as a result, the control service 204 may be authorized to manage these actions, rather than delegating tasks to the provisioning service 208.

In one or more embodiments, engine-based routing may be utilized where the resource provider environment may include a native or integrated engine that may include additional or alternative functionality with respect to one or more non-native engines. In various embodiments, the engine may be native or non-native with respect to the resource provider environment or one or more applications or configurations associated with the resource provider environment. It should be appreciated that a native engine may be one or more engines designed or otherwise provided to execute within a specific resource provider environment and/or to utilize specific functionality with respect to a resource provider environment. For example, the resource provider environment may provide, as a default or an option, a native engine to users of the environment. In contrast, a non-native engine may be a cross-platform engine that may be utilized with a variety of different environments. By way of example only, a non-native engine may correspond to one or more open source engines that may be used with a variety of different resource providers. The control service 204 may be utilized to query the provisioning service 208 to determine whether a request input by the user is a supported feature of the selected engine 210. For example, the overlay service 202 may be utilized as a routing layer and route requests to the appropriate underlying service based, at least in part, on information within the request. By way of example, if the request includes specific engine information, such as a specific call or function associated with an engine, that information may be provided to the control service 204 to enable analysis of the functionality of the request. If the request is not supported by the selected engine, the control service 204 may provide an error message to the user to indicate that one or more features are not supported and, as a result, have not been added and will not be executed by the engine.

As noted above, certain engines utilized by the engine hosting service 114 may have one or more unsupported engine features, which may cause frustration for users who attempt to use a feature associated with one engine with a second engine. In various embodiments, unsupported features may be documented and provided to users, for example for a set or list of engines.

However, users may not wish to read this documentation. Accordingly, systems and methods may include one or more discovery APIs to allow customers to programmatically discover supported engines as well as information about each engine. For example, the discovery APIs may include lists or highlights of specific supported or unsupported features for different engines. This may provide improved discovery options for users and bring particular unsupported features to a more prominent location, which may assist the user with selecting the engines in the first place.

Further illustrated is the provisioning service 208, which may serve as a front end to provide engine-specific operations responsive to requests from the control service 204. As an example, one or more engine-specific operations may include template validation, change set computations, change set executions, stack deletions, or stack importation. The illustrated provisioning service 208 may provide a common front end, such that any engine with an appropriate API contract can plug into the provisioning service 208, but may be utilized to manage and call individual engines. In various embodiments, task definitions will be utilized by the provisioning service 208 for translations for requests for different engines. Furthermore, in examples, the provisioning service 208 may also maintain a mapping for container images or versions for various engines.

Systems and methods may also utilize the provisioning service 208 for engine-specific management operations. By way of example, different versions of engines may have different options and operators, and as a result, the provisioning service 208 manages which image was used when one or more operations were performed to ensure it uses an associated container image with the same version of the engine to plan for corresponding changes.

In various embodiments, the provisioning service may communicate with one or more stack databases 212. The stack databases 212 may function as engine artifact storage, where input artifacts are transmitted to the stack database 212 and/or output artifacts are processed. In certain embodiments, multiple stack databases 212 may be utilized, which may each be configured for one or more particular operations.

As noted above, the engine hosting service 114 may be utilized with a variety of different potential provisioning engines 210. These engines 210 may be managed and supported for services unassociated with the resource provider environment, and as a result, may have different updates, versions, patches, and the like applied at various times. Users, however, may not wish to integrate these updates at all times and, as a result, may wish to maintain or utilize particular versions of the engines. Accordingly, systems and methods may enable a user to identify specific versions of their preferred engine by providing one or more engine parameters. For example, the user may specify an engine version upon creation of a stack or utilization of a resource. Thereafter, the same version will be utilized when making changes to that stack. In various embodiments, the initial specification of the version is carried forward, without additional user intervention, such that inadvertent attempts to use different versions are prevented. For example, a user utilizing Version 12 of an engine when creating a stack may return to make changes, but may now be using Version 14. Because the initial stack was created using Version 12, changes will also be implemented using tools of the engine associated with Version 12. In various embodiments, a listing may include version information for various supported engines to enable the user to select the engine of their choosing. Moreover, it should be appreciated that versions may remain consistent between stack creation, but may change between different operations. By way of example, if Stack 1 is created with Version 1.1 and Stack 2 is created with Version 1.3, changes to Stack 1 will be implemented with Version 1.1 while changes to Stack 2 will be implemented with Version 1.3. Various embodiments may manage deprecation of older versions of provisioning engines, for example by setting a retention policy to maintain certain versions. Users may be provided with a notification regarding versions and availability of engines. However, it should be appreciated that versions may be maintained for changes or updates to previously created stacks, but older versions may not be utilized for formation of new stacks after a certain date, in accordance with the retention policies.

Furthermore, systems and methods may also be utilized to enable updating stacks for operation with new versions, such as by exporting a stack state, evaluating configuration for any backwards-incompatible issues, and then updating state files to the new version of the engine.

Embodiments of the present disclosure may also include a runtime service 302 that may be utilized to execute and run one or more engines 210, which in this example are illustrated within a data store that may store configuration files for a variety of different engines. In various embodiments, the runtime service 302 may act as a representation of a container image, a container task definition, a container cluster, or the like. As a result, the runtime service 302 may be used to execute provisioning engine commands to carry out operations for various stacks. Various embodiments include an architecture configuration to run any engine that can be run as a containerized task. The container image may contain more than provisioning engine tasks and may also include one or more custom wrappers. In operation, the runtime service 302 may receive an engine operation request, for example from the provisioning service 208. Responsive to the request, the runtime service 302 may query the stack database 212 to download one or more artifacts for the operation. Moreover, the runtime service 302 may establish an environment for the engine, run associated commands for the particular engine, execute pre- or post-processing of the artifacts, and upload generated artifacts to the stack database 212.

In one or more embodiments, logical operations may incorporate one or more different engine commands. For example, a request may include commands to read a configuration file, download information from a registry, validate configuration files, and then translate a plan to an executable file. Accordingly, systems and methods may be operable such that a single command provides instructions to perform associated commands for full execution of the request.

In various embodiments, one or more engines may include additional tools or functionality in the form of plugins or extensions. These plugins may be publicly available, for example through one or more public registries, or may be private and hosted or stored by a user. While it may be beneficial to use public plugins in order to reduce internal creation time, public plugins have a greater likelihood of containing malicious code or being otherwise inoperable because they may not undergo the same quality control checks as a privately developed plugin.

Various embodiments may include a registry service 304 that may be used to identify, retrieve, and verify one or more plugins for operation with the engine 210.

The registry service 304 may serve as an intermediary layer between the engine 210 and/or the runtime service 302 and the one or more plugin libraries 306, which may include a public registry 308 and/or a private registry 310. For example, the registry service 304 may be used to query a public registry 308 to identify one or more plugins for use with the engine 210. The registry service 304, prior to enabling the plugin, may use one or more criteria to evaluate the plugin to determine whether installation is permitted. A variety of different criteria may be utilized, in combination or individually, such as deny lists, allow lists, temporary lists (e.g., lists of plugins that may be allowed with accompanying intermediate steps), or various other methods, such as one or more rules based methods. By way of example, the plugin may be compared against a list of approved plugins, and if the plugin is listed, may be permitted for installation. As another example, one or more rules based evaluations may be performed, such as scanning code portions, evaluating a publisher of the plugin, or the like. As a result, plugins may be restricted for use until they have been verified based on the one or more criteria.

Systems and methods may be utilized to support using plugins, but may not attempt or be used to curate plugins from one or more public registries 308. Accordingly, by default, plugins may be allowed unless they are found on a deny list, which may be generated based on one or more factors, such as posing a risk to the service, security issues beyond a threshold, and the like. The deny list may be maintained by the registry service 304 and periodically adjusted/updated as new versions of plugins and new plugins are developed. However, it should be appreciated that alternative operations may include, by default, blocking all plugins unless they are found on an allow list, allowing all plugins unless they fail a rule based evaluation, or blocking all plugins unless they pass a rule based evaluation, among other options.

In various embodiments, the registry service 304 may be used to evaluate the public registries 308, but not the private registries 310, as it may be likely that privately stored, hosted, and supported plugins associated with the user 102 have a reduced likelihood of containing malicious code or poor execution. However, it should be appreciated that any plugins from the libraries 306 may be screened or otherwise evaluated via the registry service 304 prior to execution by the engine 210.

In one or more embodiments, the registry service 304 is used to override an endpoint associated with a public registry for a different endpoint provided by the registry service 304. As a result, when the engine 210 makes a request to the endpoint, the registry service 304 will make the request to the associated library endpoint. In various embodiments, as noted above, evaluation criteria may be executed to determine whether the plugin may be utilized. By way of example, if the module/provider is on a deny list, then the request may be denied and a message may be provided to the engine 210. If the request is accepted, the engine 210 may fetch the plugin for use.

As noted above, various systems and methods may be deployed to address unsupported features. However, it should be appreciated that various features of one engine may be desirable and integral for use with that feature, and as a result, one or more APIs may be generated to provide support for features of particular engines. For example, a user may desire to export a stack state, which may refer to the metadata regarding a stack and its resources. Users may want to export stack states such that they may be used with other resource provider environments or with other engines. In one or more embodiments, users may select an API to export their stack state and an asynchronous job may write a file containing the stack state to one or more user stack locations and then export the file for use with other supported environments. In various embodiments, the format of the file may be different depending on which provisioning engine was utilized for the stack to enable seamless migration into and out of the resource provider environment.

Moreover, users may also wish to import their stacks into different environments. Accordingly, one or more APIs may be established to receive one or more configuration files containing information with respect to a current state of one or more stack resources, parameter values for the stack, state fields, and the like. The imported configuration files may be provided to the runtime service 302 for configuration verification and then execution. While various embodiments may enable creation of a stack using state information alone, providing additional matching configurations may provide an improved transition free from potential reverse engineering to fill in blanks or unknowns and an improved likelihood of successful stack important.

Figure 4:
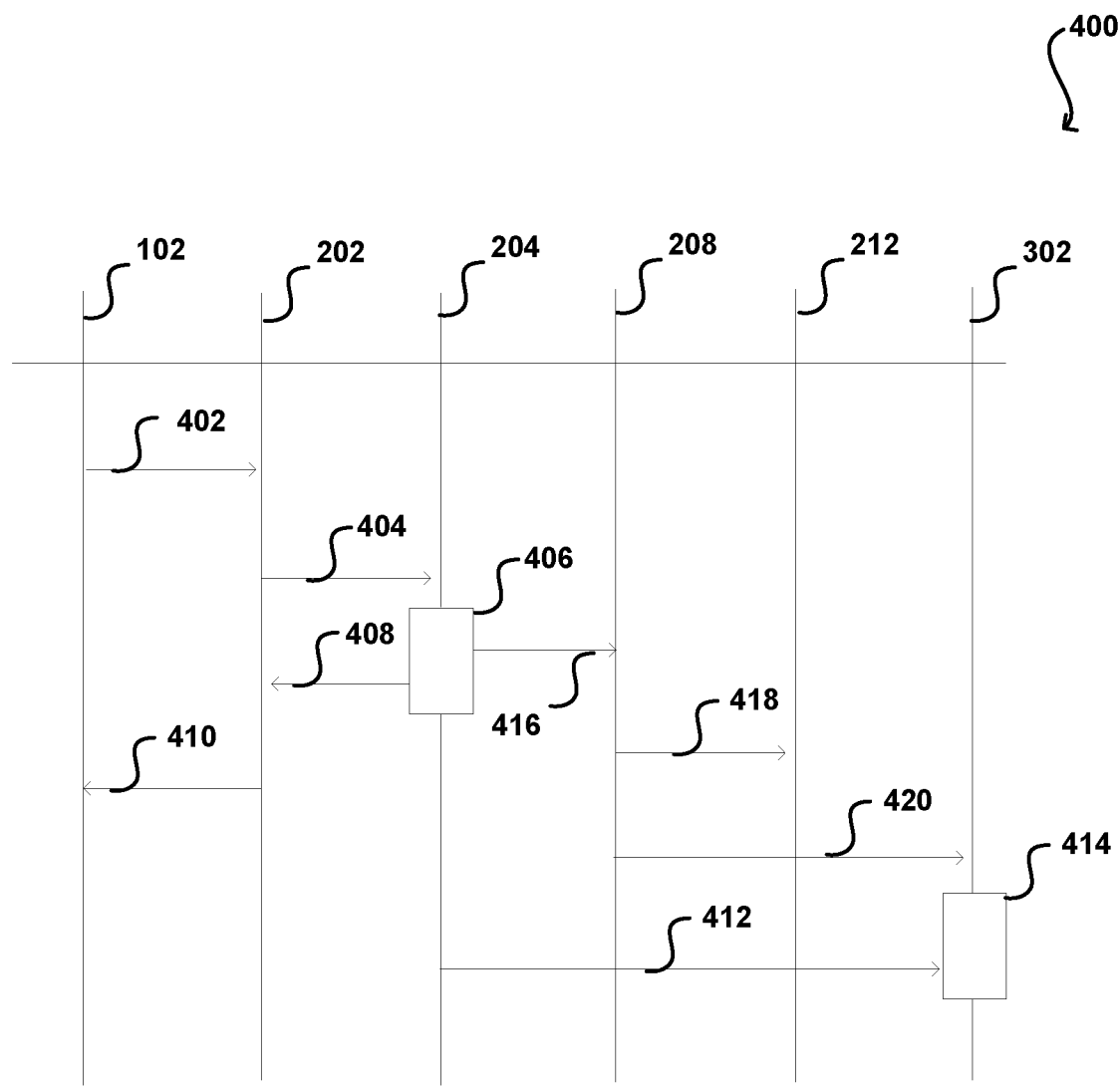
FIG. 4 illustrates a sequence diagram for one or more provisioning engines in accordance with various embodiments.

FIG. 4 illustrates an example sequence diagram 400 for selecting an engine for use with the hosting service. It should be appreciated that additional steps may be incorporated into the sequence and also, in various embodiments, steps may be removed or combined. In this example, the user 102 may submit a request 402 to the overlay service 202, which is then transmitted as a request 404 to the control service 204. In various embodiments, the control service 204 evaluates 406 the request, for example to determine whether the request is engine agnostic or engine specific. If the request is engine agnostic, a plan to execute the request may be generated and a response 408 may be transmitted to the overlay service 202 and then a response 410 is provided to the user 102. Accordingly, the control service 204 may transmit a command 412 for execution 414 at the runtime service 302.

In various embodiments, the evaluation 406 may determine that the request 404 is engine specific, and as a result, may transmit a request 416 to the provisioning service 208. The provisioning service 408 may query 418 the stack database 212 to evaluate one or more container images and then transmit a request 420 for execution 414 of the task at the runtime service 302. In this manner, requests for operations within the engine may be routed via the control service 204 and then executed at the runtime service 302.

Figure 5:
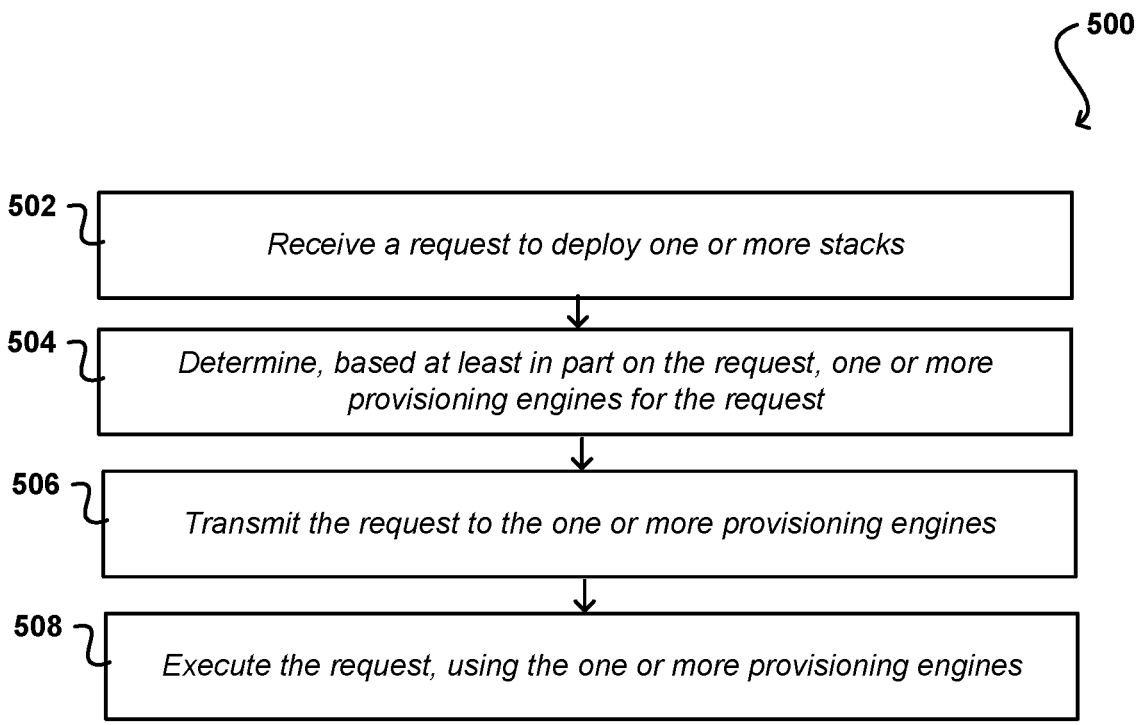
FIG. 5 illustrates an example process for executing a request using one or more provisioning engines that can be utilized in accordance with various embodiments.

FIG. 5 illustrates an example process 500 for selecting and using a provisioning engine that can be utilized in accordance with various embodiments. It should be understood that there can be additional, fewer, or alternative steps performed in similar or alternative orders, or in parallel, within the scope of the various embodiments unless otherwise specifically stated. In this example, a request is received to deploy one or more stacks 502. The request may be transmitted from a user to a resource provider environment, where the stacks are associated with provisioning and use of one or more resources associated with the resource provider environment. In at least one embodiment, a provisioning engine for performing the request is determined 504. For example, the request may identify a particular provisioning engine for use. Additionally, the request may be associated with a selected provisioning engine. In one or more embodiments, the request may include a command or instruction that is particular to a certain provisioning engine. Furthermore, in one or more embodiments, the request may include a configuration file that is associated with one or more provisioning engines. Moreover, a customer account may include a default provisioning engine. Accordingly, various information associated with the request, or provided with the request, may be used to determine a provisioning engine to perform the request.

In at least one embodiment, the request is transmitted to the one or more provisioning engines for execution 506. For example, the request may be evaluated to determine whether the request is engine-agnostic or specific to an engine. If the request is engine agnostic, a control service may directly transmit the request and enable execution. However, in other embodiments, a provisioning service may receive requests and provide requests to the engine for execution, for example by providing requests to a runtime where the engine is running. Thereafter, the request may be executed by the provisioning engine 508. For example, the provisioning engine may establish a set of resources, may monitor certain resource performance, or the like. In this manner, the user may select a particular provisioning engine for use with managing and deploying their stacks, even when using an unassociated resource provider environment.

Figure 6:
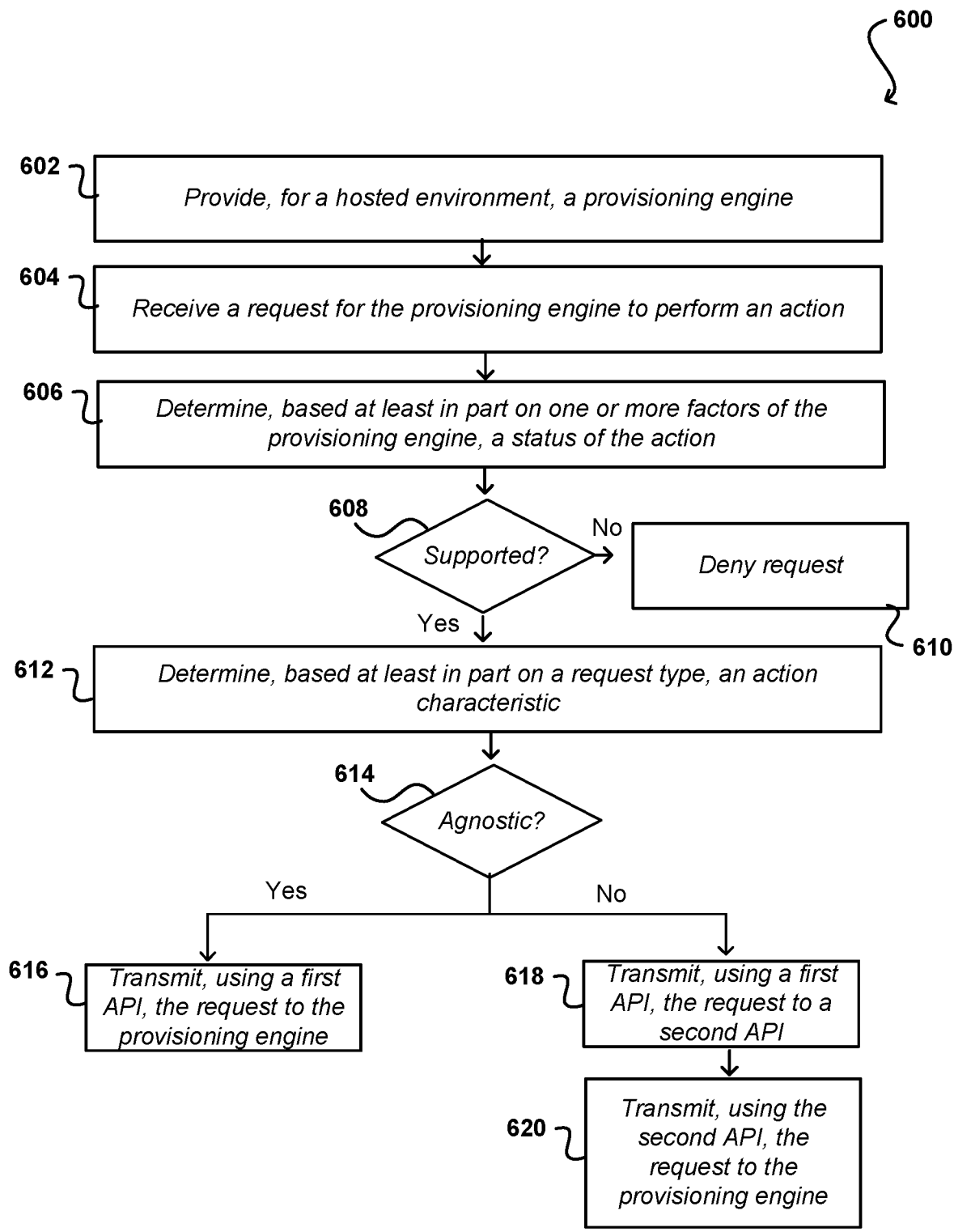
FIG. 6 illustrates an example process for performing an action with a provisioning engine that can be utilized in accordance with various embodiments.

FIG. 6 illustrates an example process 600 for evaluating an action request for a provisioning engine. In this example, a hosting environment provides a provisioning engine for use to manage or provision one or more resources 602. In at least one embodiment, the hosting environment includes one or more engine hosting services that are engine agnostic to enable a variety of different engines to interact with and utilize resources within a resource provider environment, where the user can select one or more different engines based on preferences, capabilities, or the like. In at least one embodiment, a user may configure a particular engine for their account or may pass configuration files to specify one or more engines for use. The user may also submit a request for a selected provisioning engine to perform an action 604. The action may include an action associated with using one or more features of the provisioning engine, such as to create a stack or to modify an existing stack.

In various embodiments, the engine agnostic nature of the hosting service may lead to utilization of one or more engines that lack specific features or capabilities. Accordingly, systems and methods may determine, based at least in part on one or more factors of the provisioning engine, a status of the action 606. The status may refer to whether or not the action is supported by the provisioning engine 608. If not, the requestion may be denied 610, for example by providing a message to a user to indicate that the requested action is not supported by the selected provisioning engine. If the action is supported, one or more action characteristics may be determined 612. These characteristics may be associated with an outcome, the resources needed to execute the action, or the like. Certain actions may be specific or otherwise associated with a particular engine, while others are general or widely distributed among different engines. In embodiments, it may be determined whether the requested action is engine agnostic 614. An engine agnostic action may refer to whether or not the outcome or result will be the same for any engine, or whether or not the action is specific or specialized for a particular engine.

If the action is action agnostic, a first API may be used to transmit the request to the provisioning engine 616. The first API may be a high level API that may store or otherwise manage certain actions or requests. By maintaining data for these requests, latency may be reduced and/or fewer resources may be utilized. In other embodiments, the first API may transmit the request to a second API 618, which may then acquire information to transmit the request to the engine 620. Accordingly, different levels of control planes may be utilized with various actions within the engines depending on the types of actions requested by users.

Figure 7:
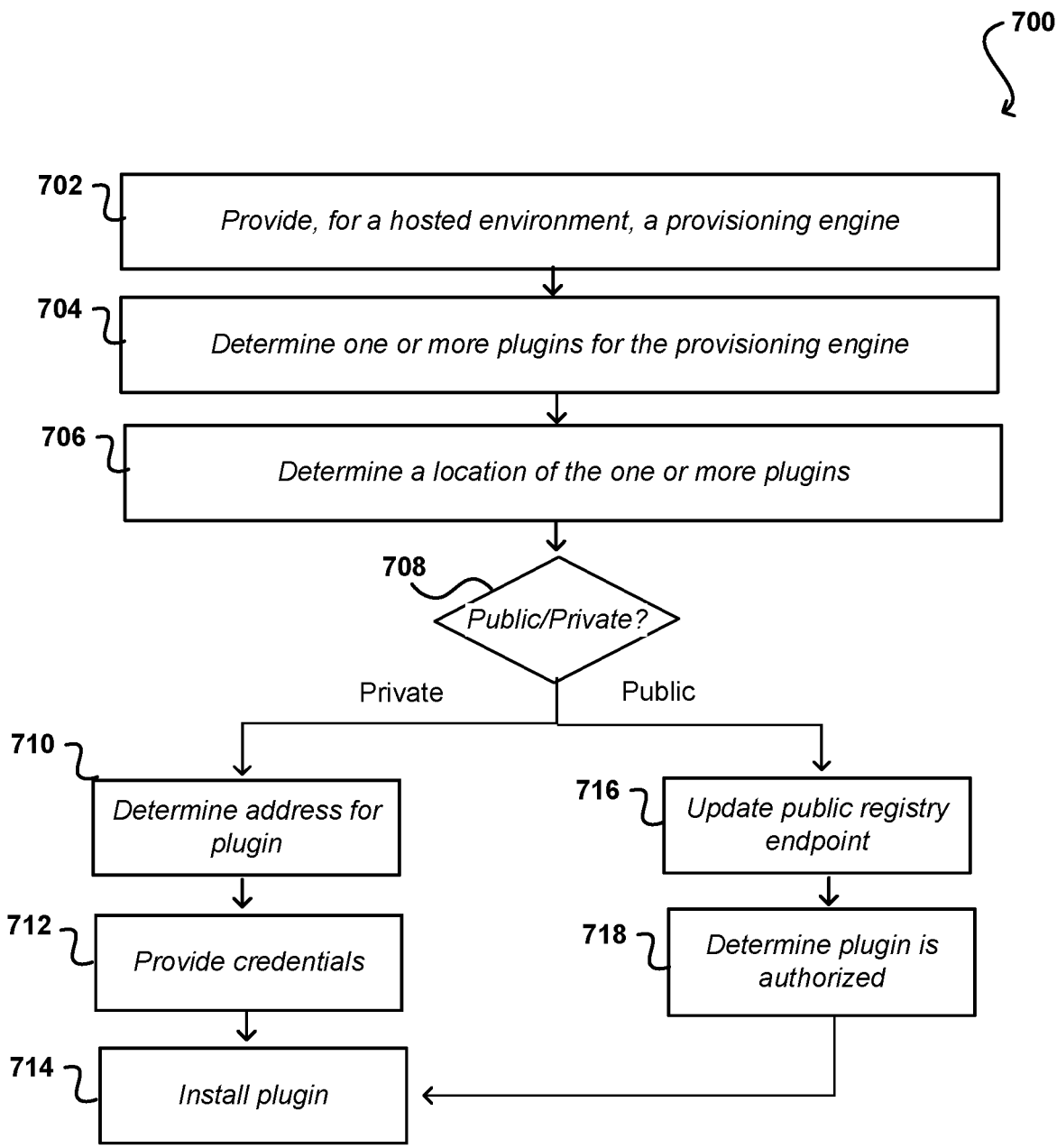
FIG. 7 illustrates an example process for adding a plugin to a provision engine that can be utilized in accordance with various embodiments.

FIG. 7 illustrates an example process 700 for incorporating one or more plugins into a provisioning engine. In this example, a provisioning engine is provided within a hosted environment 702. In various embodiments, one or more plugins associated with the provisioning engine are determined 704. For example, a configuration file associated with the provisioning engine may be provided, and the configuration file may include information that enables determination of the one or more plugins. Additionally, in various embodiments, user preferences or the like may be utilized to identify one or more plugins for the engine. A location of the one or more plugins is determined 706. The location may be directed toward an endpoint, which may be provided by a user, to download or otherwise obtain the plugins. It may be determined whether the location is public or private 708. If private, an address for the plug in may be determined 710. In various embodiments, credentials are passed to gain access to the plugins 712, and the plugins may be installed 714. In one or more embodiments, the location may be directed toward a public address. Accordingly, a public registry endpoint for the plugin may be updated 716. For example, rather than pointing directly to the plugin, the address may be updated to incorporate one or more intermediate layers that provide additional security or protection from potentially malicious or unauthorized code. The plugin may then be evaluated to determine whether the plugin is authorized 718. An authorized plugin may include a plugin that passes an evaluation using one or more criteria, such as determining whether the plugin is not on a deny list or is not provided by a vendor or author on a deny list. Additionally, as noted herein, the criteria may also include evaluation against an allow list, a rules based evaluation, or the like. Furthermore, evaluations may include multiple different methods such as both a rules based evaluation and a comparison against a list, among other options. Authorized plugins may then be installed 714. In this manner, one or more embodiments may provide additional or an extra layer of security for plugins from public sources.

Figure 8:
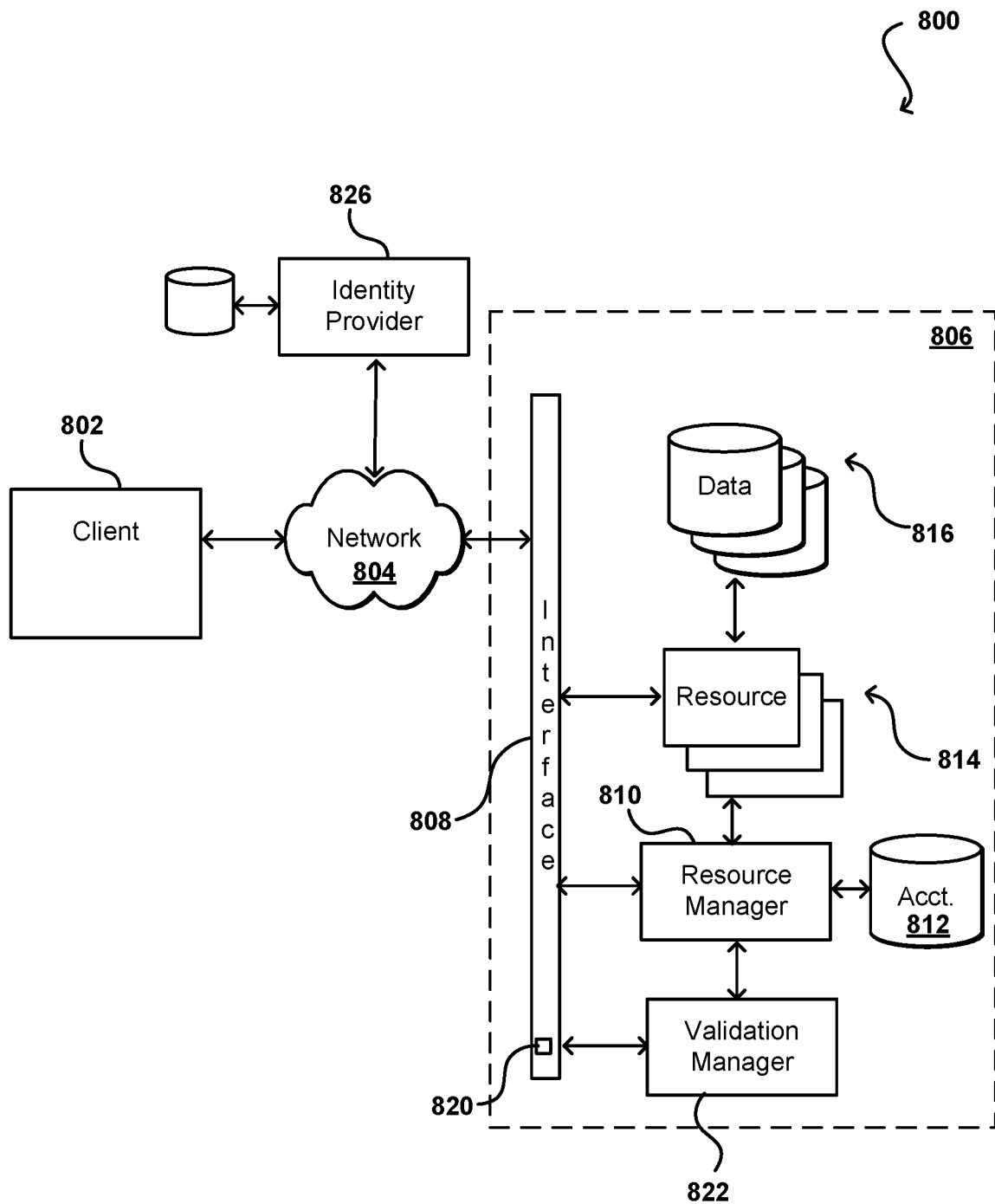
FIG. 8 illustrates an example environment in which aspects of various embodiments can be implemented.

FIG. 8 illustrates components of an example cloud computing environment 800 in which aspects of various embodiments can be implemented. In at least some embodiments, a user 802 wanting to utilize a portion of the resources 814 can submit a request over a network 804 that is received to an interface layer 808 of the provider environment 806. The interface layer can include application programming interfaces (APIs) or other exposed interfaces enabling a user to submit requests to the provider environment. The interface layer 808 in this example can also include other components as well, such as at least one Web server, routing components, load balancers, and the like. When a request to provision a resource is received to the interface layer 808, information for the request can be directed to a resource manager 810 or other such system, service, or component configured to manage user accounts and information, resource provisioning and usage, and other such aspects. A resource manager 810 receiving the request can perform tasks such as to authenticate an identity of the user submitting the request, as well as to determine whether that user has an existing account with the resource provider, where the account data may be stored in at least one data store 812 in the provider environment. A user can provide any of various types of credentials in order to authenticate an identity of the user to the provider. These credentials can include, for example, a username and password pair, biometric data, a digital signature, or other such information. These credentials can be provided by, or obtained from, a number of different entities, such as an identity provider 826, a key management service, a corporate entity, a certificate authority, an identify broker, and the like. In some embodiments, a user can provide information useful in obtaining the credentials, such as user identity, account information, password, user-specific cryptographic key, customer number, and the like. The identity provider can provide the credentials to the resource provider environment 806 and/or to the client device 802, whereby the client device can utilize those credentials to obtain access or use of various resources in the provider environment, where the type and/or scope of access can depend upon factors such as a type of user, a type of user account, a role associated with the credentials, or a policy associated with the user and/or credentials, among other such factors.

The resource provider can validate this information against information stored for the user, for example using a validation manager 822. If the user has an account with the appropriate permissions, status, etc., the resource manager 810 can determine whether there are adequate resources 814 available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. Additionally, the user may be granted access to data 816 associated with the user account. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 802 to communicate with an allocated resource without having to communicate with the resource manager 810, at least until such time as a relevant aspect of the user account changes, the user is no longer granted access to the resource, or another such aspect changes.

The resource manager 810 (or another such system or service) in this example can also function as a virtual layer of hardware and software components that handles control functions in addition to management actions, as may include provisioning, scaling, replication, etc. The resource manager 810 can utilize dedicated APIs 820 in the interface layer 808, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 808 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service.

Figure 9:
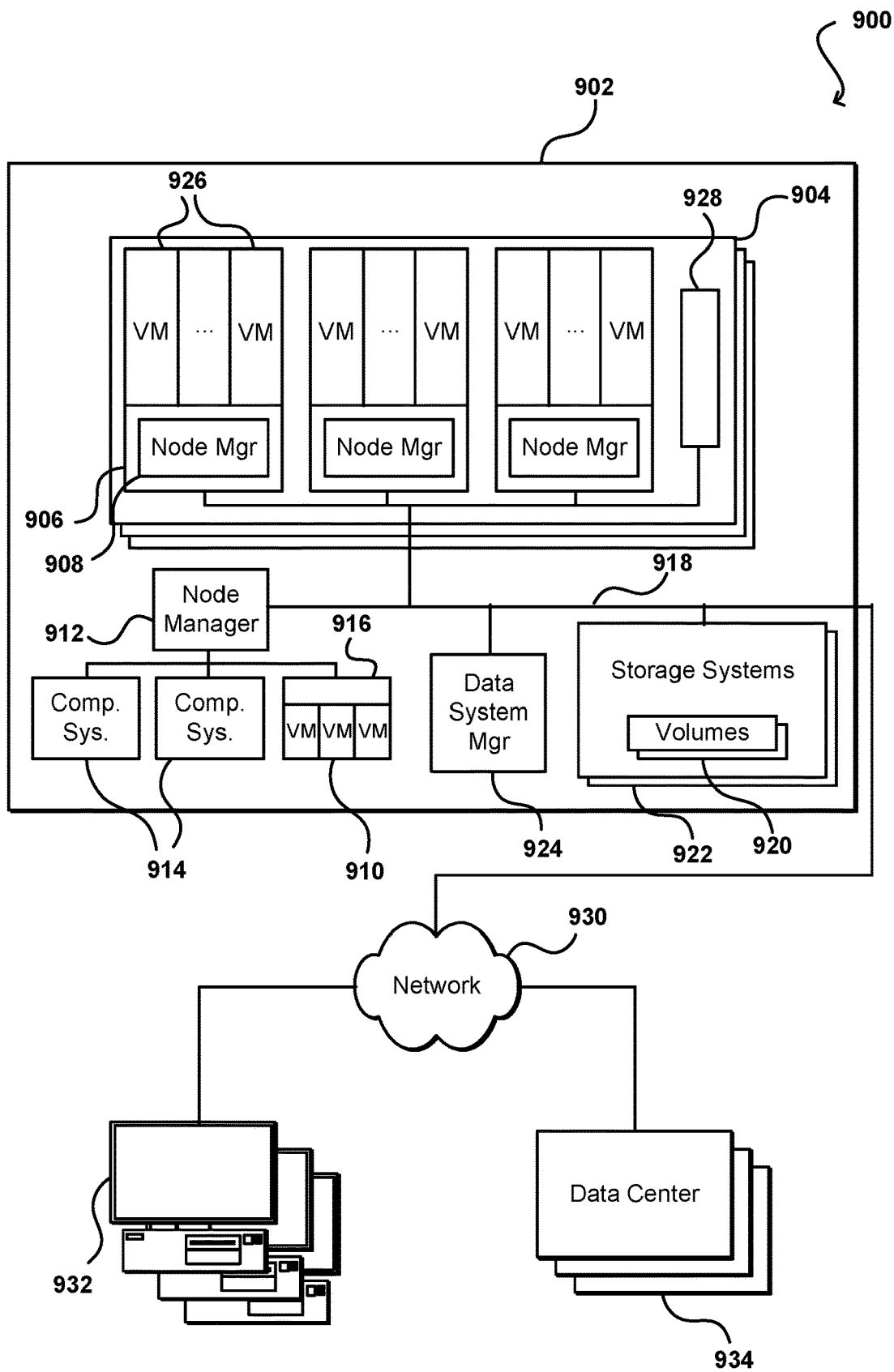
FIG. 9 illustrates components of an example data center that can be utilized in accordance with various embodiments.

FIG. 9 illustrates an example network configuration 900 in which such provisioning can be implemented in accordance with various embodiments. In this example configuration, multiple computing systems are operable to execute various programs, applications, and/or services, and further operable to access reliable block-based data storage, such as under the control of a block-based data storage service. In particular, in this example a block-based data storage service uses multiple block-based data storage systems in a data center to provide reliable, non-local, block-based data storage to executing programs or various other components, systems, or services. Multiple remote archival storage systems external to the data center may also be used to store additional copies of at least some portions of at least some block-based data storage volumes.

In this example, a data center 902 includes a number of racks 904, each rack including a number of host computing devices 906, as well as an optional rack support computing system 928 in this example embodiment. The host computing systems 906 on the illustrated rack 904 each host one or more virtual machines 926 in this example, as well as a distinct node manager module 912 associated with the virtual machines on that host computing system to manage those virtual machines. One or more other host computing systems 916 may also each host one or more virtual machines 910 in this example. Each virtual machine 910 may act as an independent resource node for executing one or more program copies or performing another such action or process for user data requests, I/O operations, etc. In addition, this example data center 902 further includes additional host computing systems 914 that do not include distinct virtual machines, but may nonetheless each act as a resource node for one or more tasks being executed for a user. In this example, a node manager module 912 executing on a computing system (not shown) distinct from the host computing systems 914 and 916 is associated with those host computing systems to manage the resource nodes provided by those host computing systems, such as in a manner similar to the node manager modules 908 for the host computing systems 906. The rack support computing system 928 may provide various utility services for other computing systems local to its rack 904 (e.g., long-term program storage, metering, and other monitoring of program execution and/or of non-local block data storage access performed by other computing systems local to the rack, etc.), as well as possibly to other computing systems located in the data center. Each computing system may also have one or more local attached storage devices (not shown), such as to store local copies of programs and/or data created by or otherwise used by the executing programs, as well as various other components.

This example the data center 902 also includes a computing system 924 that executes a data storage system manager module for the block-based data storage service to assist in managing the availability of non-local block-based data storage to programs executing on resource nodes provided by the host computing systems located within the data center (or optionally on computing systems located in one or more other data centers 934, or other remote computing systems 932 external to the data center). In particular, in this example the data center 902 includes a pool of multiple block-based data storage systems 922, which each have local block-based storage for use in storing one or more volume copies 920. Access to the volume copies 920 is provided over the internal network(s) 918 to programs executing on various resource nodes 910 and 914. As discussed in greater detail elsewhere, a block-based data storage system manager module 924 may provide a variety of services related to providing non-local block data storage functionality, including the management of user accounts (e.g., creation, deletion, billing, etc.); the creation, use and deletion of block data storage volumes and snapshot copies of those volumes; the collection and processing of performance and auditing data related to the use of block data storage volumes and snapshot copies of those volumes; the obtaining of payment from customers or other users for the use of block data storage volumes and snapshot copies of those volumes; etc. In some embodiments, the system manager module 922 may coordinate with the node manager modules 912, 908 to manage use of volumes by programs executing on associated resource nodes, while in other embodiments the node manager modules may not be used to manage such volume use. In addition, in other embodiments, one or more system manager modules 924 may be structured in other manners, such as to have multiple instances of the system manager executing in a single data center (e.g., to share the management of non-local block data storage by programs executing on the resource nodes provided by the host computing systems located within the data center), and/or such as to have at least some of the functionality of a system manager module being provided in a distributed manner by software executing on some or all of the server block data storage systems 922 (e.g., in a peer-to-peer manner, without any separate centralized system manager module on a computing system 924).

In this example, the various host computing systems, server block data storage systems, and computing systems are interconnected via one or more internal networks 918 of the data center, which may include various networking devices (e.g., routers, switches, gateways, etc.) that are not shown. In addition, the internal networks 918 are connected to an external network 930 (e.g., the Internet or another public data network) in this example, and the data center 902 may further include one or more optional devices (not shown) at the interconnect between the data center and an external network (e.g., network proxies, load balancers, network address translation devices, etc.). In this example, the data center 902 is connected via the external network 930 to one or more other data centers 934 that each may include some or all of the computing systems and storage systems illustrated with respect to data center 902, as well as other remote computing systems 932 external to the data center. The other computing systems 932 may be operated by various parties for various purposes, such as by the operator of the data center or third parties (e.g., customers of the program execution service and/or of the block data storage service). In addition, one or more of the other computing systems may be archival storage systems (e.g., as part of a remote network-accessible storage service) with which the block data storage service may interact, such as under control of one or more archival manager modules (not shown) that execute on the one or more other computing systems or instead on one or more computing systems of the data center, as described in greater detail elsewhere. Furthermore, while not illustrated here, in at least some embodiments, at least some of the server data storage systems may further be interconnected with one or more other networks or other connection mediums, such as a high-bandwidth connection over which the storage systems may share volume data (e.g., for purposes of replicating copies of volumes and/or maintaining consistency between primary and mirror copies of volumes), with such a high-bandwidth connection not being available to the various host computing systems in at least some such embodiments.

It will be appreciated that the example of FIG. 9 has been simplified for the purposes of explanation, and that the number and organization of host computing systems, server block data storage systems and other devices may be much larger than what is depicted in FIG. 9. For example, as one illustrative embodiment, there may be thousands of computing systems per data center, with at least some of those computing systems being host computing systems that may each host fifteen virtual machines or more, and/or with some of those computing systems being block-based data storage systems that may each store several volume copies. If each hosted virtual machine executes one program, a data center may execute tens of thousands of program copies at one time. Furthermore, hundreds or thousands (or more) of volumes may be stored on the server block data storage systems, depending on the number of server storage systems, size of the volumes, and number of mirror copies per volume. It will be appreciated that in other embodiments, other numbers of computing systems, programs and volumes may be used.

An environment such as that illustrated with respect to FIG. 9 can be used to provide and manage resources shared among various customers. In one embodiment, a virtualized storage system can be provided using a number of data servers, each having a number of storage devices (e.g., storage disks) attached thereto. The storage system can expose the storage to the customers as a Web service, for example. Customers then can submit Web services requests, or other appropriate requests or calls, to allocate storage on those servers and/or access that storage from the instances provisioned for those customers. In certain embodiments, a user is able to access the data volumes of these storage devices as if those storage devices are conventional block devices.

Since the data volumes will appear to the customer instances as if each volume is a disk drive or similar block device, the volumes can be addressed with offsets, lengths, and other such conventional block device aspects. Further, such a system can provide what will be referred to herein as "read after write" consistency, wherein data is guaranteed to be able to be read from the data as soon as the data is written to one of these data volumes. Such a system can provide relatively low latency, such as latencies less than about ten milliseconds. Such a system thus in many ways functions as a traditional storage area network (SAN), but with improved performance and scalability.

Using a management system as illustrated in FIG. 9, for example, a customer can make a Web service call into an appropriate API of a Web service layer of the system to provision a data volume and attach that volume to a data instance for that customer. The management system can be thought of as residing in a control plane, or control environment, with the data volumes and block storage devices residing in a separate data plane, or data environment. The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In one example, a customer with at least one provisioned instance can call a "CreateVolume" or similar API, via Web services, which enables the customer to specify the amount of storage to be allocated, such as a value between 1 GB and 1 TB, in 1 GB increments. Components of the control plane, such as a system manager module, can call into the data plane to allocate the desired amount of storage from the available resources, and can provide the customer with an identifier for the data volume. In some embodiments, the customer then can call an "AttachVolume" or similar API, wherein the customer provides values for parameters such as an instance identifier, a volume identifier, and a device name, depending on factors such as the operating system of the instance, using a scheme that the operating system provides for hard drives and similar storage devices, as from inside the instance there is no apparent difference, from at least a functionality and naming point of view, from a physical hard drive. Once the customer has attached the data volume to a provisioned instance, the customer can cause various functionality to be performed, such as to build a file system, use as raw storage for a data system, or any other such activity that would normally be performed with a conventional storage device. When the customer no longer requires the data volume, or for any other appropriate reason, the customer can call a "DetatchVolume" or similar API, which can cause the association of the instance to that volume to be removed. In some embodiments, the customer can then attach a new instance or perform any of a number of other such activities. Since the data volume will fail independently of the instances in some embodiments, the customer can attach a volume to a new instance if a currently associated instance fails.

Figure 10:
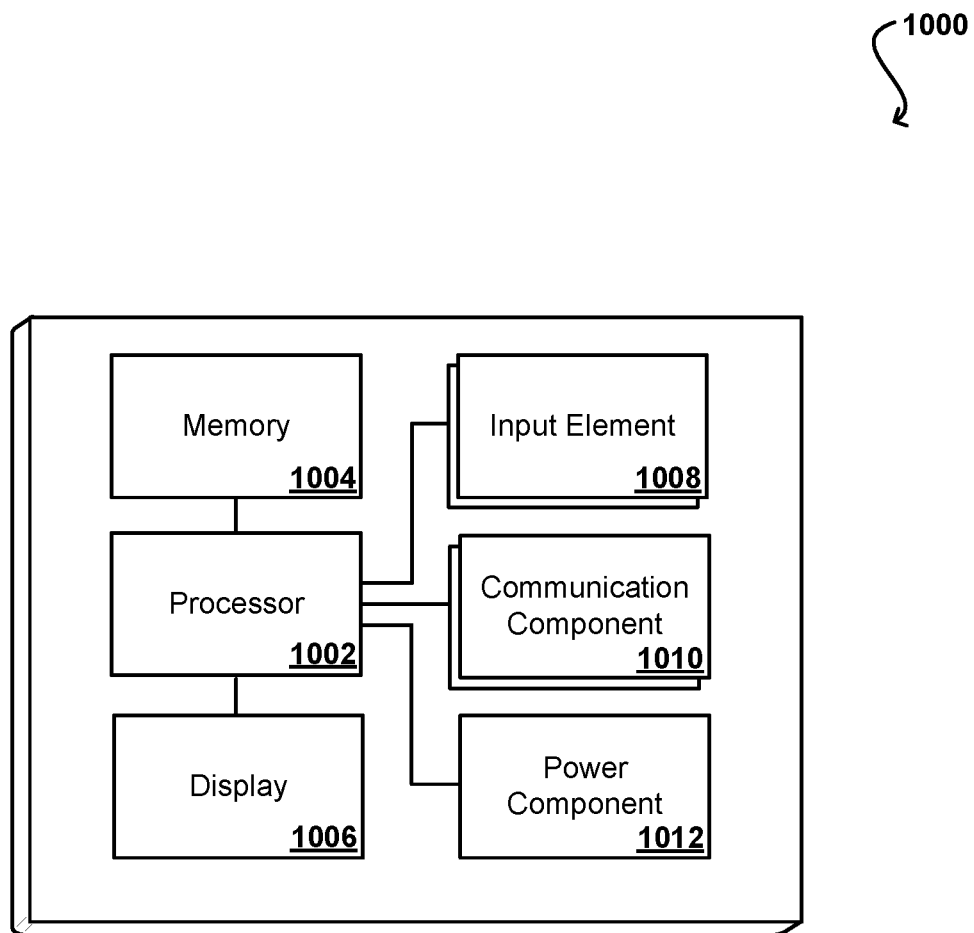
FIG. 10 illustrates components of an example computing device that can be used to perform aspects of the various embodiments.

FIG. 10 illustrates a logical arrangement of a set of general components of an example computing device 1000. In this example, the device includes a processor 1002 for executing instructions that can be stored in a memory device or element 1004. As would be apparent to one of ordinary skill in the art, the device can include many types of memory, data storage, or non-transitory computer-readable storage media, such as a first data storage for program instructions for execution by the processor 1002, a separate storage for images or data, a removable memory for sharing information with other devices, etc. The device typically will include some type of display element 1006, such as a touch screen or liquid crystal display (LCD), although devices such as portable media players might convey information via other means, such as through audio speakers. As discussed, the device in many embodiments will include at least one input element 1008 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 1000 of FIG. 10 can include one or more network interface or communication elements or components 1010 for communicating over various networks, such as a Wi-Fi, Bluetooth, RF, wired, or wireless communication systems. The device in many embodiments can communicate with a network, such as the Internet, and may be able to communicate with other such devices. The device will also include one or more power components 1012, such as power cords, power ports, batteries, wirelessly powered or rechargeable receivers, and the like.

Example environments discussed herein for implementing aspects in accordance with various embodiments are primarily Web-based, as relate to Web services and cloud computing environments, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving a first request to provision one or more resources;
   determining, based at least in part on the first request, a provisioning engine for execution within a resource provider environment;
   causing the provisioning engine to execute within the resource provider environment;
   determining that the first request is a provisioning engine-agnostic request, based at least in part on one or more first actions associated with the first request;
   transmitting, from a control service, the first request to the provisioning engine; and
   causing the provisioning engine to execute the one or more first actions associated with the first request.

2. The computer-implemented method of claim 1, further comprising:
   receiving a second request associated with one or more second actions;
   determining that the one or more second actions are provisioning engine-specific;
   transmitting the second request to a provisioning service; and
   providing, from the provisioning service, the second request to the provisioning engine.

3. The computer-implemented method of claim 1, further comprising:
   determining one or more plugins for the provisioning engine, wherein the one or more plugins are positioned within a private registry;
   providing credentials to access the private registry; and
   installing the one or more plugins.

4. The computer-implemented method of claim 1, further comprising:
   determining one or more plugins for the provisioning engine, wherein the one or more plugins are positioned within a public registry;
   determining that the one or more plugins pass an evaluation criterion; and
   installing the one or more plugins.

5. The computer-implemented method of claim 1, wherein the provisioning engine is a non-native provisioning engine.

6. A computer-implemented method, comprising:
   receiving a first request to deploy infrastructure;
   selecting, based at least in part on the first request, a provisioning engine from a set of provisioning engines to deploy the infrastructure;
   executing the provisioning engine from the set of provisioning engines within a resource provider environment;
   providing the first request to the provisioning engine from the set of provisioning engines;
   providing, within the resource provider environment, a first control plane to receive the first request;
   determining, based at least in part on the first request, that the first request is provisioning engine-agnostic; and
   storing a result of provisioning engine execution responsive to the first request.

7. The computer-implemented method of claim 6, further comprising:
   generating one or more input artifacts for the provisioning engine from the set of provisioning engines; and
   storing the one or more input artifacts within a data store, wherein the data store is accessible by the provisioning engine from the set of provisioning engines via a runtime environment.

8. The computer-implemented method of claim 6, wherein the provisioning engine from the set of provisioning engines is non-native with respect to the resource provider environment.

9. The computer-implemented method of claim 6, further comprising:
   determining one or more plugins for the provisioning engine from the set of provisioning engines; and
   calling an internal endpoint associated with the one or more plugins.

10. The computer-implemented method of claim 9, further comprising:
    retrieving an evaluation criterion associated with the provisioning engine from the set of provisioning engines;
    determining that at least one plugin of the one or more plugins fails the evaluation criterion; and
    preventing the provisioning engine from the set of provisioning engines from installing the at least one plugin of the one or more plugins.

11. The computer-implemented method of claim 6, further comprising:
    receiving a second request associated with an action to be performed by the provisioning engine from the set of provisioning engines;
    determining that the action corresponds to an unsupported action for the provisioning engine from the set of provisioning engines; and
    providing an error message.

12. The computer-implemented method of claim 6, further comprising:
    receiving a configuration file associated with the first request;
    determining one or more runtime properties of the provisioning engine from the set of provisioning engines, based at least in part on the configuration file associated with the first request; and
    executing a container, associated with the provisioning engine from the set of provisioning engines, according to the one or more runtime properties of the provisioning engine from the set of provisioning engines.

13. The computer-implemented method of claim 6, further comprising:
    determining a create version of the provisioning engine from the set of provisioning engines associated with a stack, wherein the create version of the provisioning engine from the set of provisioning engines corresponds to a version utilized to create the stack;
    determining a current version of the provisioning engine from the set of provisioning engines if different from the create version of the provisioning engine from the set of provisioning engines;
    receiving a request to change the stack; and
    executing the request to change the stack using the create version of the provisioning engine from the set of provisioning engines.

14. A system, comprising:
at least one processor; and
a memory storing instructions that, when executed by the at least one processor, cause the system to:
receive a first request to deploy infrastructure;
select, based at least in part on the first request, a provisioning engine from a set of provisioning engines to deploy the infrastructure;
execute the provisioning engine from the set of provisioning engines within a resource provider environment;
provide the first request to the provisioning engine from the set of provisioning engines;
provide, within the resource provider environment, a first control plane to receive the first request;
determine, based at least in part on the first request, that the first request is provisioning engine-agnostic; and
store a result of provisioning engine execution responsive to the first request.

15. The system of claim 14, wherein the instructions, when executed by the at least one processor, further cause the system to:
generate one or more input artifacts for the provisioning engine from the set of provisioning engines; and
store the one or more input artifacts within a data store, wherein the data store is accessible by the provisioning engine from the set of provisioning engines via a runtime environment.

16. The system of claim 14, wherein the instructions, when executed by the at least one processor, further cause the system to:
determine one or more plugins for the provisioning engine from the set of provisioning engines; and
call an internal endpoint associated with the one or more plugins.

17. The system of claim 16, wherein the one or more plugins are privately hosted.

18. The system of claim 16, wherein the instructions, when executed by the at least one processor, further cause the system to:
determine that the one or more plugins are associated with a public registry; and
determine that the one or more plugins satisfy one or more evaluation criterion.

19. The system of claim 14, wherein the instructions, when executed by the at least one processor, further cause the system to:
receive a file corresponding to a configuration for a stack, wherein the file has one or more parameter values for the stack; and
verify the configuration for the stack upon execution of a new stack.

* * * * *